United States Patent [19]

Haendle

[11] Patent Number: 4,606,064

[45] Date of Patent: Aug. 12, 1986

[54] RADIODIAGNOSTIC SYSTEM WITH A FLAT PICTURE INTENSIFIER

[75] Inventor: Joerg Haendle, Erlangen, Fed. Rep. of Germany

[73] Assignee: Siemens Aktiengesellschaft, Berlin and Munich, Fed. Rep. of Germany

[21] Appl. No.: 612,165

[22] Filed: May 21, 1984

[30] Foreign Application Priority Data

May 27, 1983 [DE] Fed. Rep. of Germany ....... 3319309

[51] Int. Cl.$^4$ ............................................. H05G 1/64
[52] U.S. Cl. ...................................... 378/99; 358/111
[58] Field of Search ........................... 358/111; 378/99

[56] References Cited

U.S. PATENT DOCUMENTS 4,104,516  8/1978  Wang ........................... 250/213 VT
4,146,794  3/1979  Duinker ............................. 358/111

Primary Examiner—Craig E. Church

[57] ABSTRACT

The invention relates to a radiodiagnostic system with an x-ray tube, flat picture intensifier, a coupled television camera system, a central unit and a monitor, wherein an image storage panel is connected to the television camera system and to the monitor and is coupled by its clock input with the central unit. At the central unit setting means are provided which act on the central unit in such a way that the vertical-to-horizontal frequency ratio of the television camera system is reduced by a factor N, the ratio of the image element clock frequency of the image storage panel to the horizontal frequency is increased by the same factor N, and the read-in process into the image storage panel is delayable in row and/or column direction, so that only a selectable image detail is displayable on the monitor.

6 Claims, 3 Drawing Figures

RADIODIAGNOSTIC SYSTEM WITH A FLAT PICTURE INTENSIFIER

BACKGROUND OF THE INVENTION

The invention relates to a radiodiagnostic system including an x-ray tube, a flat picture intensifier, a coupled television camera system, a central unit, and a monitor. Such a radio diagnostic system serves for the reproduction of x-ray pictures on the monitor.

In German patent DE-OS No. 21 41 676 a radio diagnostic system is described where, following the patient in the ray path, an x-ray image intensifier with electron optics is arranged. The reduced output image thereof is taken by a television camera and reproduced on a monitor. By switching the high voltage applied at the electrodes of the x-ray picture intensifier, the electron optics can be varied, so that a certain region of the input field, smaller than the maximum input area, is projected on the output fluorescent screen of the x-ray picture intensifier. Due to this, the parts of the patient traversed by the x-rays appear enlarged on the monitor; such enlargement is called zooming.

In U.S. Pat. No. 4,104,516 a radio diagnostic apparatus is described wherein a beam from an x-ray source is transformed into light by a flat picture intensifier whose output fluorescent screen has the same size as its input screen. Via an optic system the output image of the flat picture intensifier is projected on the target of a television camera and is scanned in a controlled manner by a pilot generator. The scanned video signal is reproduced on the monitor. As an electron-optical magnification does not take place in the flat picture intensifier, the x-ray picture appearing on the monitor cannot be acted upon as to its size by electron-optical changes.

SUMMARY OF THE INVENTION

The object of the invention is to provide a radio diagnostic device, such as a diagnostic x-ray device, in which reproduction size can be modified when using an x-ray television chain with flat picture intensifier, such as a panel type x-ray image intensifier.

According to the invention, this object is achieved in that an image storage panel is connected to the television camera system and to the monitor and is coupled by its clock input with the central unit; that at the central unit setting means are provided which act on the central unit in such a way that the vertical-to-horizontal frequency ratio of the television camera system is reduced by a factor N, while the ratio of the image element clock frequency of the image storage panel to the horizontal frequency is increased by the same factor N and the read-in process into the image storage panel is delayable in row and/or column direction, so that only a selectable image detail is displayable on the monitor. By this arrangement the entire area of the target of the television camera tube is indeed scanned, but only a portion of the area is stored in the image storage panel, the content of which is projected on the entire fluorescent screen of the monitor. It is thus possible also with a flat picture intensifier to zoom the image.

A compact design of the radio diagnostic system is obtained if the flat picture intensifier and the television camera tube of the television camera system are combined in such a way that the output screen of the flat picture intensifier is coupled with the input screen of the television camera tube. The usual components of an x-ray apparatus can be used if the image of the output fluorescent screen of the flat picture intensifier is projected by an optic system on the target of the television camera tube of the television camera system.

The zooming is easier to control and to adjust if the central unit comprises two clocks connected with a pilot generator, if the first clock is connected with deflection coils of the television camera tube, if the second clock is connected to the image storage panel, and if the setting means comprise a first adjuster for the frequency of the first clock and at least a second adjuster for the delay of the clock pulse of the second clock. A simple design results if the first clock consists of dividers connected with a clock pulse generator, wherein the divider ratio of which is selectable by the first adjuster.

The second clock can be realized in a simple manner if it comprises a first time stage to which the vertical pulses are supplied, if at the first time stage a second time stage is connected which is coupled with the first input of a first AND element, the second input of which receives the horizontal pulses, if at the output of the first AND element a series connection of a third and of a fourth time stage is connected, if the output signal of the fourth time stage is supplied to one input of a second AND element, the second input of which likewise receives the horizontal pulses, and if the first time stage and the third time stage are variable in their time duration by the second adjuster.

Other features and advantages of the present invention will become apparent from the following detailed description, and from the claims.

For a full understanding of the present invention, reference should now be made to the following detailed description and to the accompanying drawings.

DETAILED DESCRIPTION

Figure 1:
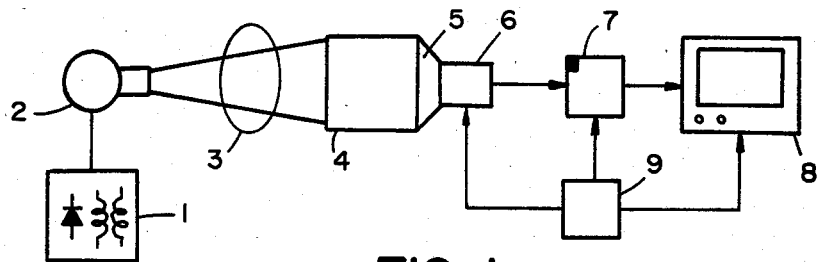
FIG. 1 shows diagammatically a radio diagnostic system with an x-ray television chain.

In FIG. 1 is shown an x-ray tube 2 operated by high-voltage generator 1; it emits a beam which passes through patient 3 and casts an image on the input fluorescent screen of x-ray flat picture intensifier 4. The output image of the flat picture intensifier 4 is projected, for example by optic system 5, onto the target of a television camera tube of television camera 6. The video signal scanned from the target of the television camera tube of television camera 6 is read into image storage panel 7 and displayed on monitor 8. A central unit 9 controls the synchronism of the signal generation and processing of television camera 6, of image storage panel 7, and of monitor 8.

Figure 2:
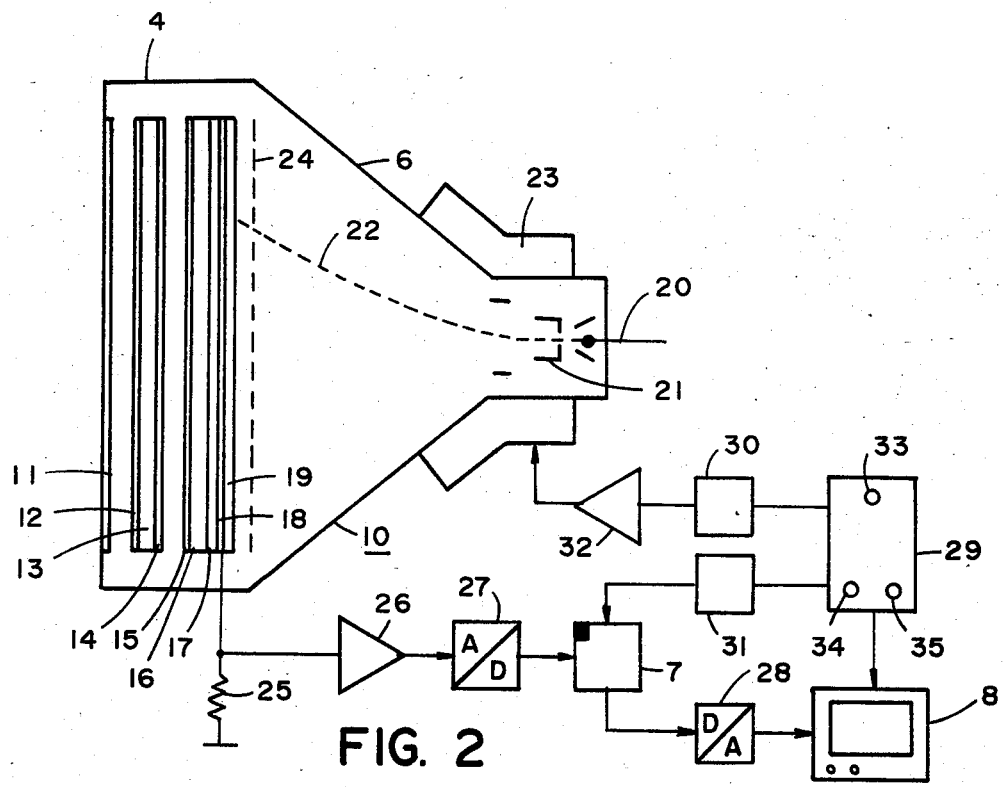
FIG. 2 shows diagrammatically the basic design of a specific image intensifier television camera tube and the x-ray television chain shown in FIG. 1.

FIG. 2 illustrates the x-ray television chain 4 to 9. As x-ray image converter and television camera system there serves a combined arrangement including a flat picture intensifier section 4 and a television camera tube section 6. It comprises housing 10 with vacuum window 11, which may be made of aluminum. In the beam direction behind vacuum window 11 a support plate 12 is arranged, also of aluminum for example, on which an x-ray fluorescent screen 13 (e.g. cesium iodide) is vapor deposited, on which there is photocathode 14. After an interval another layer system is arranged, consisting of a support layer 17 on which a fluorescent screen 16 is vapor deposited on the image intensifier side. Before this fluorescent screen 16 is an electron-transmissive, conductive, light-reflecting layer 15, which may consist for example of aluminum. This layer 15 reflects the light produced in fluorescent screen 16. On support layer 17, which may consist for example of a glassfiber plate, a transparent conductive layer 18 which consists for example of $SnO_2$, is applied on the side of the television camera tube section 6. Next there is applied on the conductive layer 18 a photo-semiconductor 19, such as CdSe.

On the other side of the housing are arranged cathode 20 and electrodes 21. From cathode 20 there originates an electron beam 22, which is deflected by deflection coils 23. The electron beam 22 scans the photo-semiconductor 19. If slow electrons are used for scanning, a grid type field mesh 24 is arranged before the photo-semiconductor 19.

The video signal is conducted from the conductive layer 18 through a grounded resistor 25, to which a video amplifier 26 is connected. In an analog/digital converter (A/D converter 27) the output signal of video amplifier 26 is digitalized and supplied to image storage panel 7. The output of image storage panel 7 is connected with a digital/analog converter (D/A converter 28) which converts the stored digital signal into an analog video signal and displays it on monitor 8.

Central unit 9 comprises pilot generator 29 with a clock pulse generator 36, to which are connected monitor 8 and two clocks 30 and 31. The first clock 30 consists, for example, of dividers; the divider ratio of which can be varied by first adjuster 33 on the pilot generator 29 and thereby the frequencies, derived from the frequency of clock pulse generator 36, of first clock 30 for the deflection of electron beam 22 of television camera tube 6. At first clock 30 a deflection amplifier 32 is connected with image storage panel 7. Two additional adjusters 34 and 35, also arranged on pilot generator 29, make it possible to act upon second clock 31.

Figure 3:
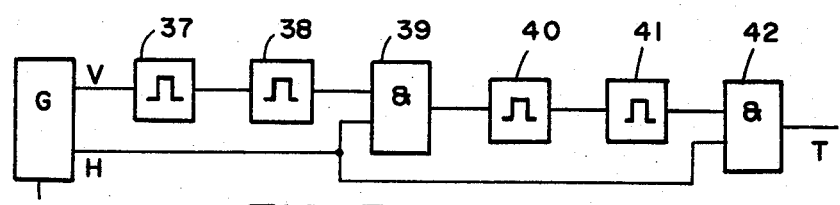
FIG. 3 is a block diagram of one of the clocks shown in FIG. 2.

The mode of operation of this second clock 31 will now be explained more specifically with reference to FIG. 3. It brings about a delay of the image element clock frequency supplied to the image storage panel 7, which frequency is derived from the frequency of clock pulse generator 36. The unchanged vertical pulses V of the television system are generated by clock pulse generator 36 of pilot generator 29 and are supplied to a first time stage 37, the output of which is connected to a second time stage 38. The output of the second time stage 38 is connected with the first input of an AND element 39, to the second input of which the likewise unchanged horizontal pulses H of the clock pulse generator 36 are supplied. At the output of the AND element 39, a series connection of a third and of a fourth time stage 40 and 41 is connected. The output of the fourth time stage 41 is connected with one input of a second AND element 42 and to the second input which likewise the horizontal pulses H of the clock pulse generator 36 are supplied.

The run-down of first time stage 37 determines the vertical position of the desired detail. The first time stage 37 triggers second time stage 38, which determines how many lines of the image are read into image storage panel 7. The second time stage 38 opens the AND element 39 and thus connects the horizontal pulses of the clock pulse generator 36 through to third time stage 40, which determines the horizontal position of the desired detail. The fourth time stage 41 triggered by third time stage 40 switches the image element clock T through to image storage panel 7 and determines the number of image elements to be read into image storage panel 7.

The second adjuster 34 changes the run-down time of first time stage 37, so that thereby the vertical position of the start of the detail is changed. By the third adjuster 35 the run-down time of the third time stage 40 is selected, so that the horizontal position of the start of the detail can be set. The run-down times of the second and fourth time stages 38 and 41 are fixed and correspond to the storage capacity of image storage panel 7. If, for example, an image storage panel with $512 \times 512$ image elements is used, the second time stage 38 will have a run-down time of 512 lines (512 vertical pulses) and the fourth time stage 41 a run-down time of 512 image elements (corresponding to 512 horizontal pulses). The time stages may consist of monostable multivibrator stages or of counting stages.

With reference to an example, the storage process will now be explained more specifically. In a common television system with for example 625 lines, when using for example a digital image storage panel as described above, 512 lines are read in, which are divided into 512 image elements each. Thereby almost the complete television picture is stored. Now if certain details are to be enlarged, the flat picture amplifier 4 does not permit electron-optical zooming. But in order to obtain an enlargement nevertheless, at for example constant image element clock frequency for the read-in, by means of adjuster 33 the horizontal frequency is reduced for example by a factor of $N=2$ and the vertical frequency by for instance the factor $N \times N = 4$. Thereby, for one thing, the number of lines is doubled and the scanning speed in horizontal direction is cut in half. Now if reading into the above named image storage panel continues with the same image element clock frequency as in the normal case, with 512 image elements only half the line is read in. And since at the same time also the number of lines has increased, only half the lines are stored. This means that a detail which corresponds to one fourth the total image is read into image storage panel 7 and is displayed on monitor 8.

To make the position of the detail within the image freely selectable, adjusters 34 and 35 are provided, which bring about a delay of the image element clock pulse. If, for example, the image detail is to lie exactly in the center of the monitor image, the image element clock pulse is suppressed for 256 lines by clock 31. This is done by first time stage 37. Thereafter second time stage 38 releases the horiztonal pulses H by the first AND element. With the 257th line, the first 256 clock pulses are also suppressed by the third time stage 40. The following 512 pulses are released by the fourth time stage 41 by the second AND element 42 and supplied to image storage panel 7. The remaining 256 pulses which would belong to a complete total line are suppressed by AND element 42 and by fourth time stage 41 of clock 31. The next 511 lines are scanned in the same manner. Subsequently, second time stage 38 blocks the clock pulses for the last 256 lines of the complete image. Due to this, the lines and image elements lying in the center of the total image occupy the total storage space of image storage panel 7. In the subsequent reproduction, the stored partial image is then reproduced on the entire television picture of monitor 8, so that the detail appears enlarged.

For marking during the fluoroscopy—carried out before the x-ray picture is taken—of the selected detail, there may be provided in a known manner a bright edging which defines the detail and which is produced by pilot generator 29 and is faded into the fluoroscopic picture. In fluoroscopy the desired detail can thus be selected by adjusters 33 and 34 and, having switched to radiography or to enlarging fluoroscopy, it can be displayed on monitor 8.

Instead of reducing the horizontal and vertical frequency, alternatively the image element clock frequency can be increased by the factor N at constant horizontal frequency, while the vertical frequency must then be reduced only by the factor N. All that matters, therefore, is the vertical-to-horizontal frequency ratio by which the factor N must be reduced and the ratio of image element clock to horizontal frequency which is increased by the factor N.

There has thus been shown and described a radiodiagnostic system with a flat picture intensifier which fulfills all the objects and advantages sought therefor. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. In a diagnostic x-ray device for producing x-ray images having an x-ray tube, a panel type x-ray image intensifier coupled to a television camera system producing a video signal, a central unit and a monitor connected to the television camera system to receive the video signal for displaying the x-ray images, wherein the image displayed on the monitor comprises pixels arranged in rows and columns, the improvement comprising an image storage device connected to the television camera system and to the monitor, which is coupled by its clock input with the central unit, setting means provided at the central unit which act on the central unit such that the vertical-to-horizontal frequency ratio of the television camera system is reduced by a factor N, while the ratio of the pixel clock frequency of the image storage device to the horizontal frequency is increased by the same factor N and the read-in process into the image storage device is delayable in directions of the rows and columns of the monitor image, so only a selectable image detail is displayable on the monitor.

2. The radiodiagnostic system according to claim 1, wherein the flat picture intensifier and the television camera tube of the television camera system are combinable such that the output fluorescent screen of the flat picture intensifier is coupled with the input screen of the television camera tube.

3. The radiodiagnostic system according to claim 1, wherein the image of the output fluorescent screen of the flat picture intensifier is projected by an optic system on the target of the television camera tube of the television camera system.

4. The radiodiagnostic system according to claim 1, wherein the central unit further comprises two clocks which are connected with a pilot generator, the first clock connected with deflection coils of the television camera tube, the second clock connected at the image storage panel, and the setting means comprising a first adjuster for the frequency of the first clock and at least a second adjuster for delaying the clock pulse of the second clock.

5. The radiodiagnostic system according to claim 4, wherein the first clock comprises dividers connected with a clock pulse generator, the divider ratio of which is selectable by the first adjuster.

6. The radiodiagnostic system according to claim 5, wherein the second clock comprises a first time stage to which the vertical (V) pulses are supplied, that at the first time stage a second time stage is connected which is connected with the first input of a first AND element, the second input of which receives the horizontal pulses (H), that at the ouput of the first AND element a series connection of a third and a fourth time stage is connected, that the output signal of the fourth time stage is supplied to the input of a second AND element, the second input of which likewise receives the horizontal pulses (H), and that the first time stage and the third time stage are variable as to their time duration by the second adjuster.

* * * * *